UNITED STATES PATENT OFFICE.

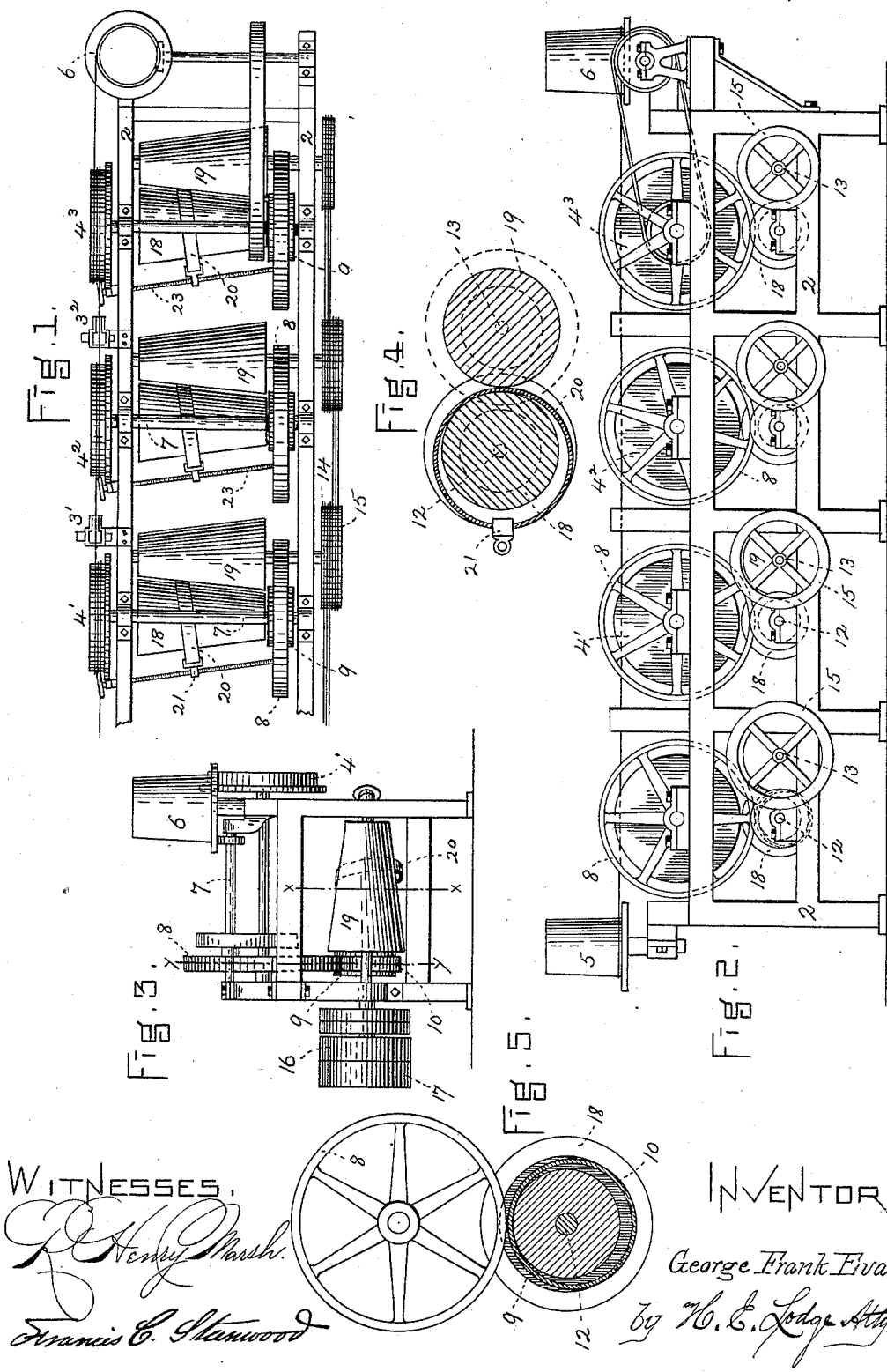

GEORGE FRANK EVANS, OF SOMERVILLE, MASSACHUSETTS.

WIRE-DRAWING MACHINE.

SPECIFICATION forming part of Letters Patent No. 448,214, dated March 17, 1891.

Application filed July 31, 1890. Serial No. 360,470. (No model.)

*To all whom it may concern:*

Be it known that I, GEORGE FRANK EVANS, a citizen of the United States, residing at Somerville, in the county of Middlesex and State of Massachusetts, have invented certain new and useful Improvements in Wire-Drawing Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to wire-drawing machines, particularly that class in which a continuous length or coil of wire is successively passed through a series of reducing-dies to produce the desired size of wire.

My invention relates to that assemblage of parts in the above class of machines by means of which the wire-drawing drum is actuated and its speed regulated, said drum pulling the wire to cause its passage through the reducing-die. The wire, after making one or more turns about said drum, is conducted through a second reducing-die with a co-operating drum, and so on until the desired size of wire has been produced.

The particular object and advantages of my invention will be more fully hereinafter explained.

The drawings accompanying this specification represent, in Figure 1, a plan of a wire-drawing machine containing my improvements. Fig. 2 is a side elevation, and Fig. 3 an end view. Fig. 4 is a section on line $y\ y$ in Fig. 3. Fig. 5 is a section on line $x\ x$ to show the endless bands.

In said drawings I have represented the side housings or frame of the machine at 2 2. Exteriorly of the standard and upon the front side of the machine are positioned a series of reducing-dies 3' 3², &c., while a series of wire-drawing drums 4' 4² 4³ are located between said dies and co-operate therewith, one drum for each die, the wire traveling in parallelism with the front of the machine, and, passing from the reel 5 through a reducing-die, is made to take one or more turns about the drum which receives the wire from said die, thence through a series of other dies and drums to a reel or drawing-block 6, upon which it is coiled in a finished condition.

To acquire complete control of said drums and have them revolve in unison, while at the same time to enable the operator to change their speed at will, is one object of my invention. A further purpose is to so arrange the driving mechanism that the greatest power shall be obtained with the least effect upon the main driving train. To secure such results I have mounted the wire-drawing drums each upon an independent shaft 7 transversely of the machine-frame.

I will premise my description of the mechanism for actuating each wire-drawing drum by saying that such assemblage of parts is the same for each drum in the series, whatever the number on the machine; consequently a description of one will suffice for all.

The end of the shaft 7 opposite that which carries the drum is furnished with a friction-pulley 8. Said pulley is straight-faced or a section of a cylinder and co-operates with a smaller pulley or pinion 9. The latter or driving-pulley is flanged to receive a loose endless band 10, which passes between the pulleys, the latter not being contiguous, but arranged to grip the band, and thus transmit motion. The pinion 9 is affixed to a shaft 12, preferably in alignment beneath the shaft 7, while a third shaft 13 in the same plane, but laterally of said shaft 12, is likewise journaled in the machine-frame. This latter shaft may be termed the "driving-shaft," and is extended beyond the machine-frame on the rear side, where it is equipped with two grooved pulleys 14 15. The latter are operated by rope transmission, as shown in the present instance by main driving-pulleys 16 17, fast and loose, respectively.

To interconnect the shafts 12 13 and to obtain variable speed, I have affixed upon said shafts two reversely-conical rolls 18 19, so mounted that their adjacent surfaces are non-contiguous to receive a loose endless band 20, which is to be gripped by and passed between them. This band travels through a guide 21, mounted upon a screw-threaded rod 23, whereby movement of said band endwise of the rolls is produced by the rotation of said rod in either direction. This peculiar mechanism for producing variable speed is fully described in United States Letters Patent No. 374,296, issued in my name on the 6th day of December, 1887, as likewise mechanism by which pressure upon the belt can be increased or diminished.

By the combination of the above-mentioned parts it will be seen that each of the wire-drawing drums by which the wire is forcibly pulled through the reducing-dies is mounted on an independent shaft 7 and is driven by the large pulley 8 and the small pulley 9. In this way a forcible leverage is exerted and the most economical arrangement is employed with a great saving of power.

In each assemblage of drum-driving mechanism the band 20 can be accurately and easily adjusted to rotate the drums $4'$ $4^2$ $4^3$ in unison and depending upon the quality of metal under treatment; or, in other words, the rapidity in movement varies with the ductility of the wire passing through the reducing-dies. The latter have no connection with my invention, so I have omitted a description of their construction and operation, which is the same as that usually employed for this class of work.

In lieu of the rope transmission here shown any form of mechanism may be employed to operate the wire-drawing machine with equally good results as by belting or by a train of gears.

What I claim is—

1. In combination with a prime motor, the reversely-conical rolls actuated thereby, the endless band between said rolls, a wire-drawing drum, its independent shaft, and the interconnecting pulleys with the endless band therebetween, substantially as and for purposes explained.

2. In a wire-drawing machine, a fixed reducing-die and the independent shaft furnished with a wire-drawing drum at one end and a friction-pulley at the opposite end, combined with an endless band, two reversely-conical pulleys between which said band passes, and two parallel shafts which support said conical pulleys, one shaft connecting with the prime motor, the other with the independent shaft of the wire-drawing drum, substantially as and for purposes explained.

3. In a wire-drawing machine having a suitable standard, a series of reducing-dies thereupon, the series of reversely-conical rolls, an endless band adjustable between each pair of said rolls, driving and driven, and a series of supporting-shafts 12 13, combined with a series of flanged pulleys upon the shafts 12, a series of wire-drawing drums, their independent shafts 7, the actuating-pulleys thereupon, and a series of endless bands interposed between said driven pulleys 8 and driving-pulleys 9, substantially as stated and described.

4. The combination, with the pair of reversely-conical rolls actuated by suitable means, the endless band between said rolls, a reducing-die, and the wire-drawing drum cooperating therewith, of an independent shaft which carries said drum, the friction-pulley 8 thereupon, the shaft 12, and a friction-pulley 9, which transmits motion from the conical rolls to the wire-drawing-drum shaft, substantially as specified.

In testimony whereof I affix my signature in presence of two witnesses.

GEORGE FRANK EVANS.

Witnesses:
H. E. LODGE,
FRANCIS C. STANWOOD.